(12) United States Patent  (10) Patent No.: US 7,537,235 B2
Flater et al.  (45) Date of Patent: May 26, 2009

(54) LIGHTWEIGHT FIFTH WHEEL HITCH ASSEMBLY

(75) Inventors: James H. Flater, Holland, MI (US); Gerald W. Hungerink, Holland, MI (US); Steven L. Hoek, Holland, MI (US); Jason D. C. Howe, Holland, MI (US); Michael H. Ginocchio, Grand Haven, MI (US)

(73) Assignee: SAF-Holland, Inc., Holland, MI (US)

( * ) Notice: Subject to any disclaimer, the term of this patent is extended or adjusted under 35 U.S.C. 154(b) by 584 days.

(21) Appl. No.: 10/532,899

(22) PCT Filed: Nov. 7, 2003

(86) PCT No.: PCT/US03/35409

§ 371 (c)(1),
(2), (4) Date: Apr. 27, 2005

(87) PCT Pub. No.: WO2004/043741

PCT Pub. Date: May 27, 2004

(65) Prior Publication Data

US 2006/0103109 A1   May 18, 2006

(51) Int. Cl.
*B62D 53/08* (2006.01)
(52) U.S. Cl. .................. 280/433; 280/438.1
(58) Field of Classification Search ........... 280/431, 280/433, 434, 435, 438.1
See application file for complete search history.

(56) References Cited

U.S. PATENT DOCUMENTS

| | | | | | |
|---|---|---|---|---|---|
| 2,072,661 | A | * | 3/1937 | Walther et al. | 280/434 |
| 2,513,117 | A | * | 6/1950 | Stephen | 280/440 |
| 2,738,205 | A | * | 3/1956 | Vaugoyeau | 280/432 |
| 2,794,656 | A | * | 6/1957 | Seyferth | 280/438.1 |
| 2,861,818 | A | * | 11/1958 | Kayler et al. | 280/434 |
| 3,148,893 | A | * | 9/1964 | Cole et al. | 280/434 |
| 3,827,709 | A | | 8/1974 | Madura et al. | |
| 3,844,584 | A | | 10/1974 | Fontaine | |
| 4,140,328 | A | * | 2/1979 | Fontaine | 280/434 |
| 4,659,101 | A | | 4/1987 | Buckley | |
| 4,871,182 | A | | 10/1989 | Altherr et al. | |
| 4,946,183 | A | | 8/1990 | Benson et al. | |

FOREIGN PATENT DOCUMENTS

| | | |
|---|---|---|
| DE | 3343242 | 9/1985 |
| DE | 44 12 303 | 9/1994 |
| DE | 4412303 | 11/1994 |
| EP | 0307006 | 3/1989 |
| EP | 0 307 006 | 5/1989 |

* cited by examiner

*Primary Examiner*—Paul N Dickson
*Assistant Examiner*—Daniel Yeagley
(74) *Attorney, Agent, or Firm*—Price, Heneveld, Cooper, DeWitt & Litton, LLP

(57) ABSTRACT

A fifth wheel hitch assembly includes a hitch plate having a rearward end that defines a throat for receiving a kingpin. First and second structural support ribs extend downwardly from a bottom surface of the hitch plate. A pair of ears extend longitudinally between the first and second support ribs. Each ear includes an aperture adapted to receive a pivot pin to pivotably support the top hitch plate on a supporting structure. Each ear is substantially offset from at least a selected one of the first support rib and the second support rib.

4 Claims, 7 Drawing Sheets

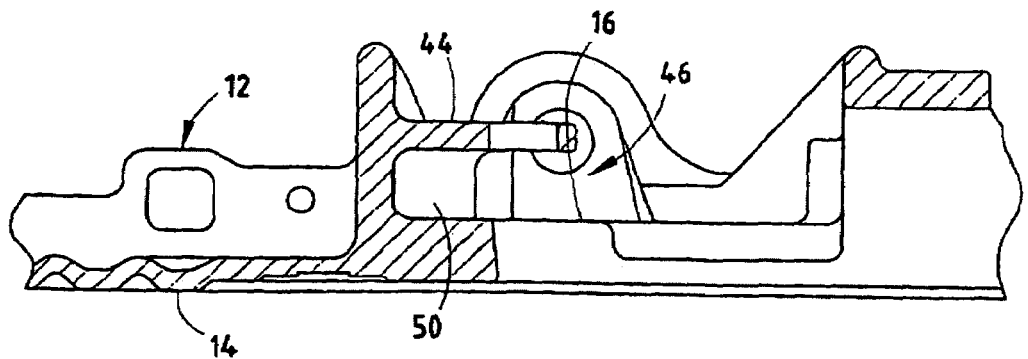
FIG. 5
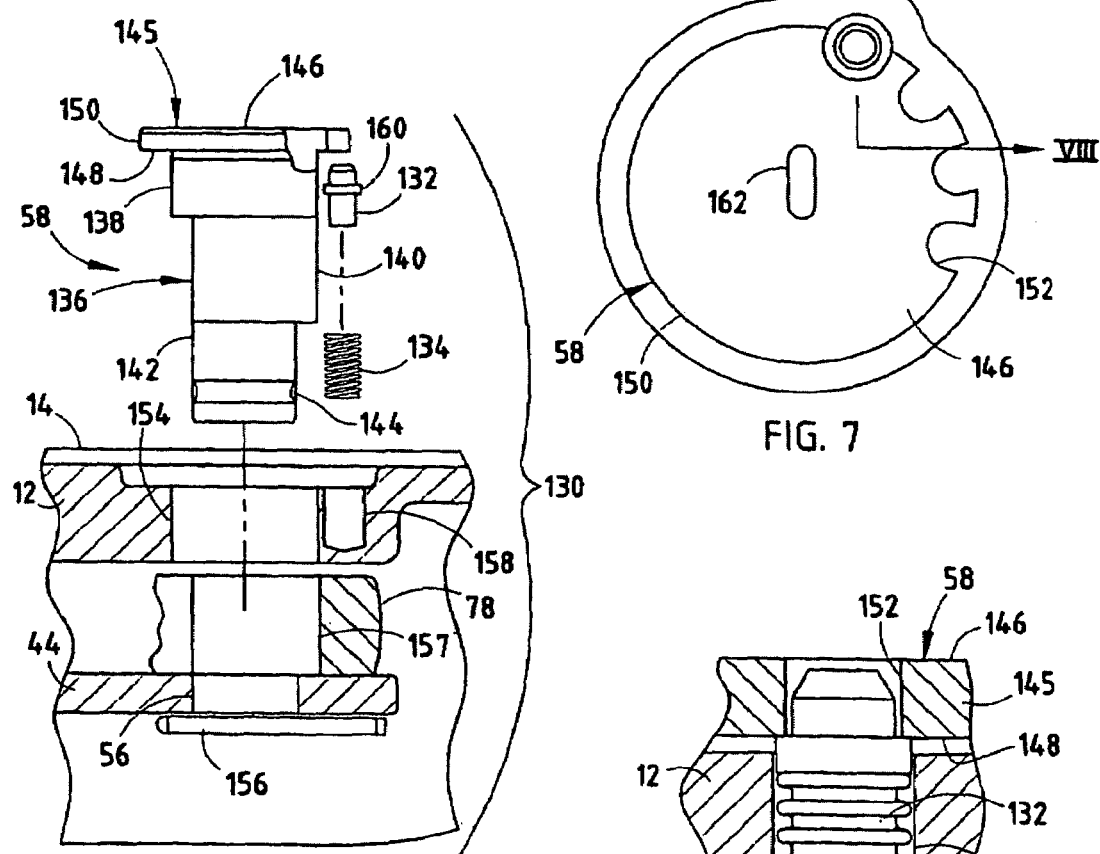
FIG. 6
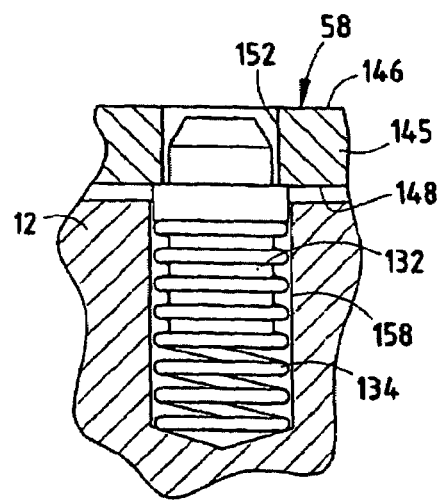
FIG. 7
FIG. 8

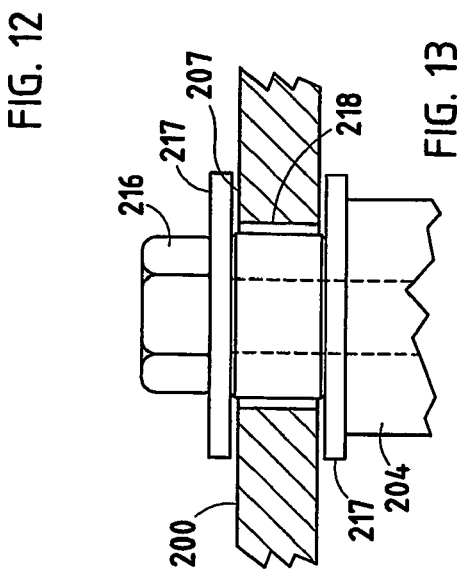
FIG. 12
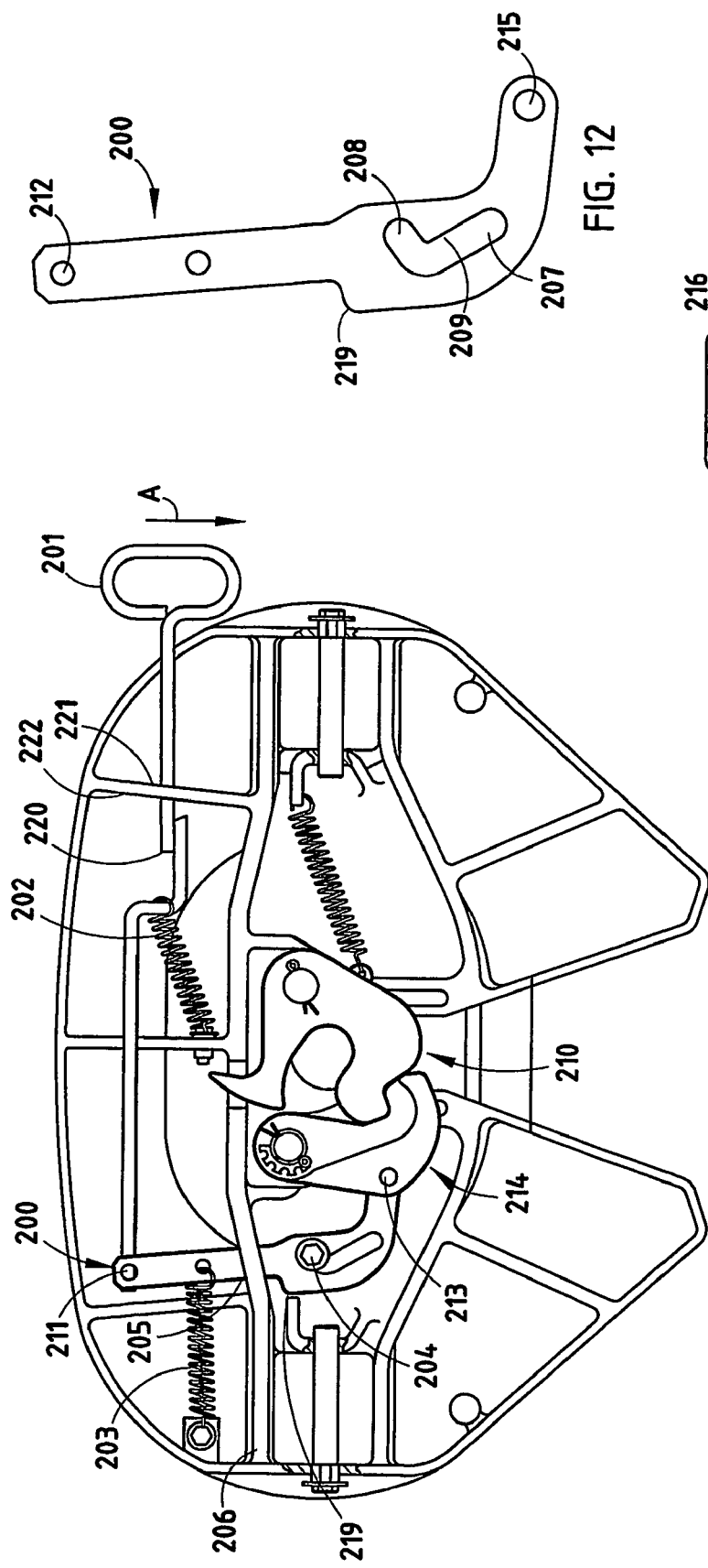
FIG. 13
FIG. 11

LIGHTWEIGHT FIFTH WHEEL HITCH ASSEMBLY

BACKGROUND OF THE INVENTION

This invention relates to fifth wheel hitches, and in particular to a lightweight fifth wheel hitch assembly.

Fifth wheel hitches are used in a wide variety of commercial and recreational vehicle applications. Typically, fifth wheel hitches include a top plate that is pivotably supported from and with respect to the associated vehicle. In the present competitive marketplace, the top plates must be designed to support the necessary loads, while simultaneously keeping manufacturing costs at a minimum. Additionally, due to road weight limits for commercial trucks, the hitch assembly should be low in weight so as to allow more cargo weight to be hauled. Further, the overall fifth wheel hitch must be easy to assemble during the construction thereof and easy to adjust during use, thereby assuring proper connection between the fifth wheel hitch and associated kingpin and complying with safety standards.

SUMMARY OF THE INVENTION

A top hitch plate adapted for use within a fifth wheel hitch includes a top surface adapted to support a load thereon, bottom surface opposite the top surface, and forward end having a convex shape, and a rearward end bifurcated into a first portion and a second portion, wherein the first portion and the second portion define a throat therebetween for receiving a king pin therein. The top hitch plate further includes a first laterally extending structural support rib extending downwardly from the bottom surface and located between the forward end and the rearward end of the top hitch, and a second laterally extending structural support rib extending downwardly from the bottom surface and located between the first support rib and the rearward end of the top hitch. The top hitch plate further includes a pair of ears extending longitudinally between the first and second support ribs, wherein each ear includes an aperture extending therethrough adapted to receive a pivot pin therein to pivotably support the top hitch plate on a supporting structure, and wherein each ear is substantially offset from at least a select one of the first support rib and the second support rib.

Another aspect of the present invention is to provide a top plate adapted for use within a fifth wheel hitch that includes a top surface adapted to support a load thereon, a bottom surface opposite the top surface, a forward end having a convex shape, a rearward end bifurcated into a first portion and a second portion, wherein the first portion and the second portion define a throat therebetween for receiving a kin pin therein. The top hitch plate also includes a first laterally-extending structural support rib extending downwardly from the bottom surface and located between the forward end and the rearward end of the top hitch plate, and a second laterally extending structural support rib extending downwardly from the bottom surface and located between the support rib and the rearward end of the top hitch plate. The top hitch plate further includes a planar shelf member substantially offset from the bottom surface, wherein the shelf member is connected directly to only a select one of the first support rib and the second support rib.

Yet another aspect of the present invention is to provide a fifth wheel hitch assembly operable between a fully locked condition and a fully released condition that includes a top hitch plate including a top surface adapted to support a load thereon, a bottom surface opposite the top surface, a forward end having a convex shape, and a rearward end bifurcated into a first portion and a second portion, wherein the first portion and the second portion define a throat therebetween for receiving a king pin therein. The fifth wheel hitch assembly also includes a release lever shiftably coupled with the hitch plate, and L-shaped first linkage member having a first end pivotably coupled to the release lever, and second end pivotably coupled to the hitch plate, and a midpoint located between the first end and the second end of the first linkage member, a second linkage member having a first end and a second end, wherein the first end of the second linkage member is pivotably coupled to the midpoint of the first linkage member, and including a longitudinally-extending slot extending therethrough and located between the first end and the second end of the second linkage member, wherein the second linkage member is shiftably coupled to the hitch plate through the slot, and a third linkage member having a first end and a second end, wherein the first end of the third linkage member is pivotably coupled to a second end of the second linkage member defining a first pivot point. The fifth wheel hitch assembly further includes a lock jaw pivotably coupled to the hitch plate at the throat of the hitch plate and pivotable between a fully locked position and a fully released position, and a hook jaw pivotably mounted to the hitch plate defining a second pivot point, the hook jaw being pivotal between an engaged position, wherein the hook jaw engages the lock jaw and retains the lock jaw in the fully locked position, and an unengaged position, wherein the lock jaw is able to pivot to the fully released position. The hook jaw is pivotably connected to the second end of the third linkage member defining a third pivot point. The first pivot point is located rearward of the third pivot point, and the third pivot point is located rearward of the second pivot point, thereby assisting in maintaining the lock jaw in the fully locked position.

Another aspect of the present invention is to provide a fifth wheel hitch assembly operable between a fully locked condition and a fully released condition that includes a top hitch plate including a top surface adapted to support a load thereon, a bottom surface opposite the top surface, a forward end having a convex shape, and a rearward end bifurcated into a first portion and a second portion, wherein the first portion and the second portion define a throat therebetween for receiving a king pin therein. The fifth wheel hitch assembly also includes a lock jaw pivotably coupled to the hitch plate at the throat of the hitch plate and pivotable between a fully locked position and a fully released position, and a jaw pin rotatably coupled to the hitch plate and pivotably coupling the lock jaw to the hitch plate. The jaw pin includes a cammed shaft portion and a head portion, wherein the cammed shaft portion abuts the lock jaw such that rotation of the jaw pin adjusts the location of the lock jaw with respect to the hitch plate, and wherein the head portion includes an outer peripheral edge having a plurality of notches spaced radially thereabout. The fifth wheel hitch assembly further includes an adjustable pin movable between an engaged position, wherein the adjustable pin is received within one of the notches of the jaw pin, thereby preventing rotation of the jaw pin, and an unengaged position, wherein the adjustment pin is not located within one of the notches of the jaw pin, thereby allowing rotation of the jaw pin.

Still yet another aspect of the present invention is to provide a fifth wheel hitch assembly that includes a top hitch plate including a forward end having a convex shape, a rearward end bifurcated into a first portion and a second portion, wherein the first portion and second portion define a throat therebetween for receiving a king pin therein, a top surface adapted to support a load thereon, a bottom surface opposite the top surface, at least one longitudinally extending outer wall having an aperture extending therethrough, and at least one longitudinally extending inner wall having an aperture extending therethrough. The fifth wheel hitch assembly also includes a pivot pin having a central axis, a shank portion received within the aperture of the outer wall and an aperture of the inner wall, and a head portion having an outer surface, an inner surface abutting the outer wall, and at least one flat side edge. The fifth wheel hitch assembly further includes a locking washer having an outer surface and an inner surface that abuts the outer surface of the head portion of the pivot pin, thereby preventing the pivot pin from being removed from within the apertures of the outer wall and the inner wall, and a locking bolt having a central axis that is offset from the central axis of the pivot pin, wherein the locking bolt abuts the outer surface of the locking washer.

The present inventive fifth wheel hitch assembly is lightweight, durable, reduces manufacturing costs associated therewith, is easily assembled during construction, easily adjusted during operation, is efficient to use, economical to manufacture, capable of a long operating life, and is particularly well adapted for the proposed use.

These and other advantages of the invention will be further understood and appreciated by those skilled in the art by reference to the following written specification, claims and appended drawings.

BRIEF DESCRIPTION OF THE DRAWINGS

FIG. 5 is a cross-sectional side view of the fifth wheel hitch assembly, taken along the line V-V, FIG. 4;

FIG. 6 is an exploded, partial cross-sectional side view of a hook jaw adjustment mechanism;

FIG. 7 is an enlarged plan view of the hook jaw adjustment mechanism;

FIG. 8 is a cross-sectional view of an adjustment pin of the hook jaw adjustment mechanism;

FIG. 11 is a bottom plan view of a fifth wheel hitch assembly according to another aspect of the present invention;

FIG. 12 is a release cam member of the hitch assembly of FIG. 11; and

FIG. 13 is a fragmentary, cross-sectional view of the host of the hitch of FIG. 11.

DETAILED DESCRIPTION OF THE PREFERRED EMBODIMENTS

Figure 1:
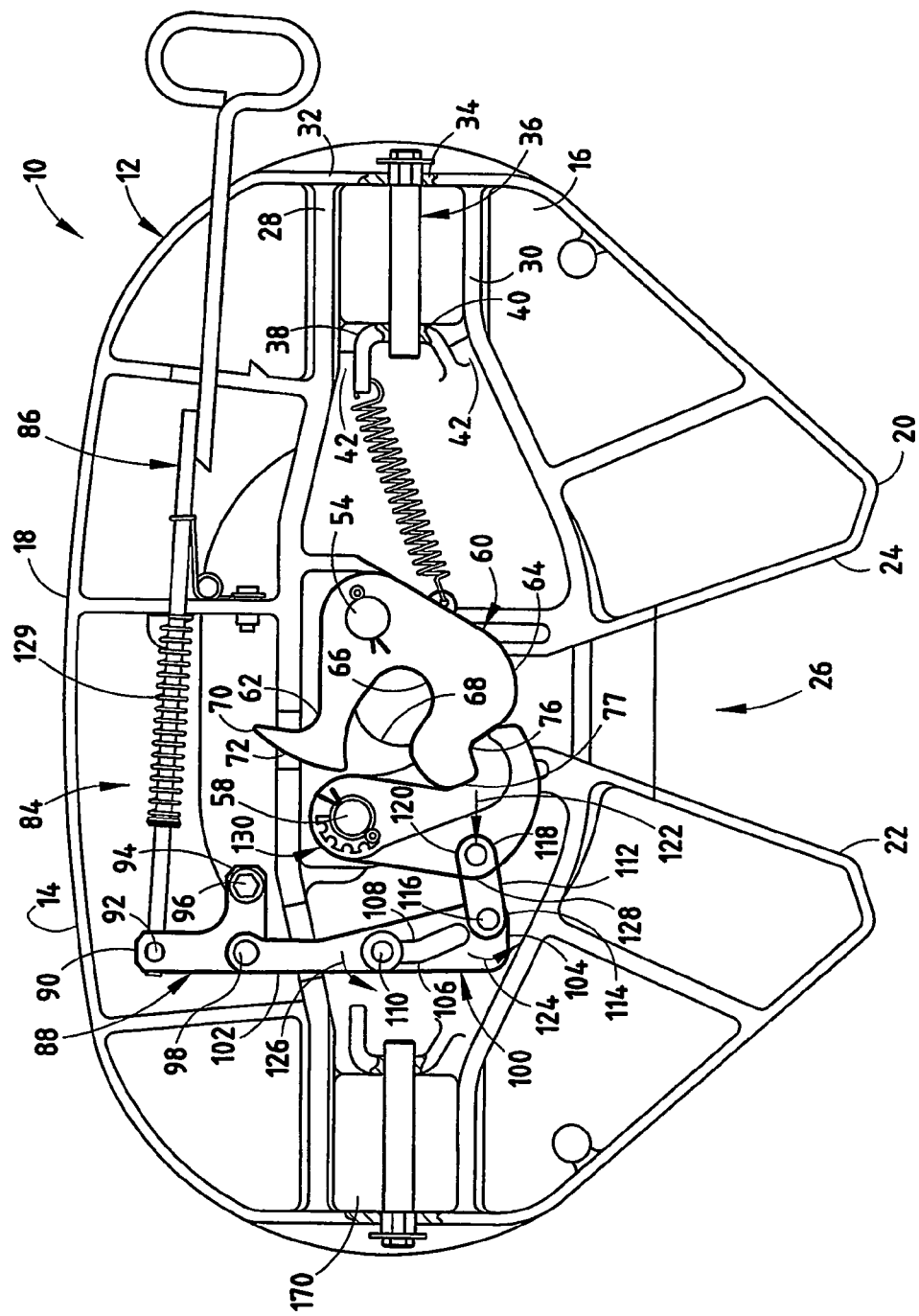
FIG. 1 is a bottom plan view of a fifth wheel hitch assembly embodying the present invention, wherein the fifth wheel hitch assembly is in a fully locked condition.
Figure 2:
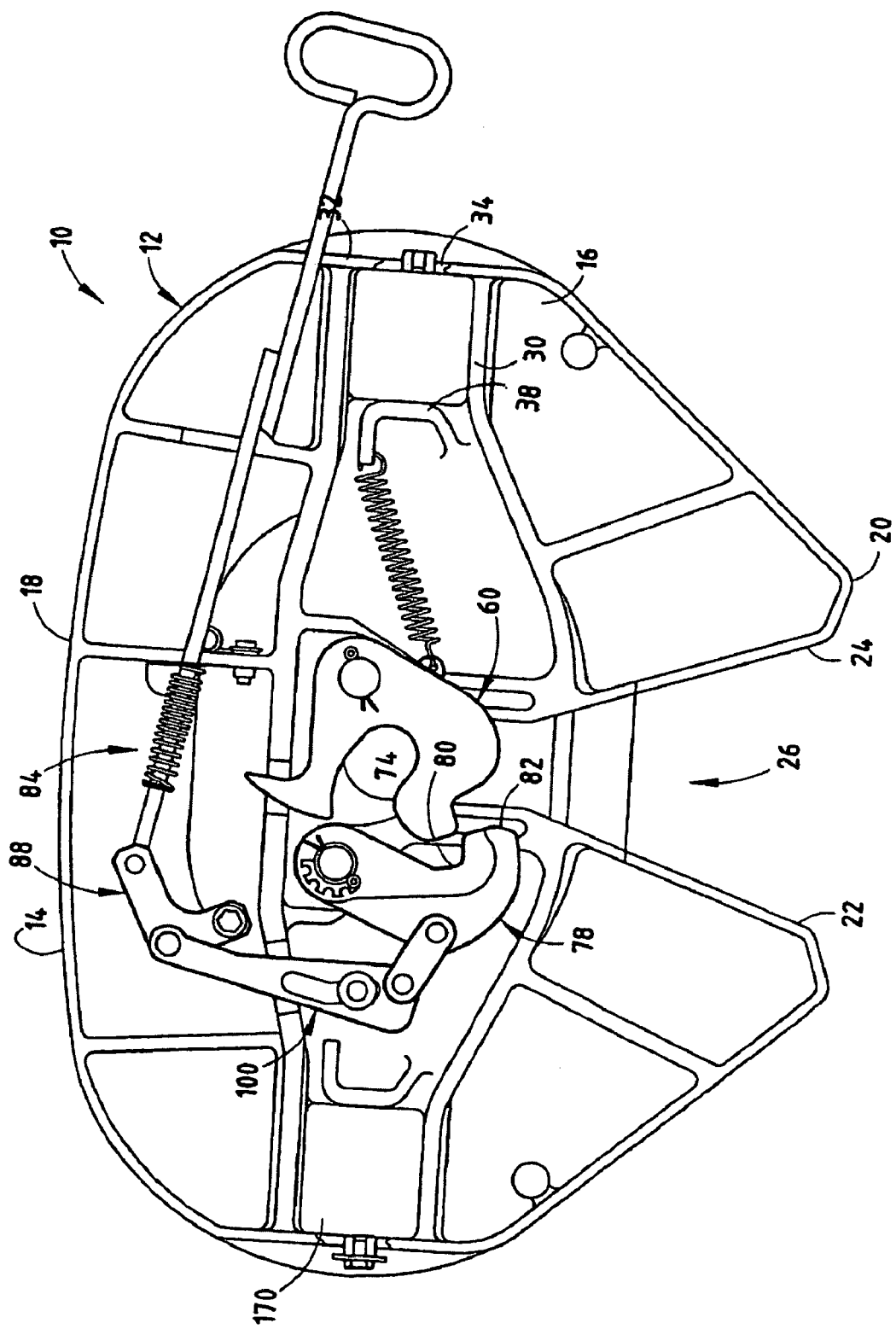
FIG. 2 is a bottom plan view of the fifth wheel hitch assembly, wherein the fifth wheel hitch assembly is in an unlocked condition.
Figure 3:
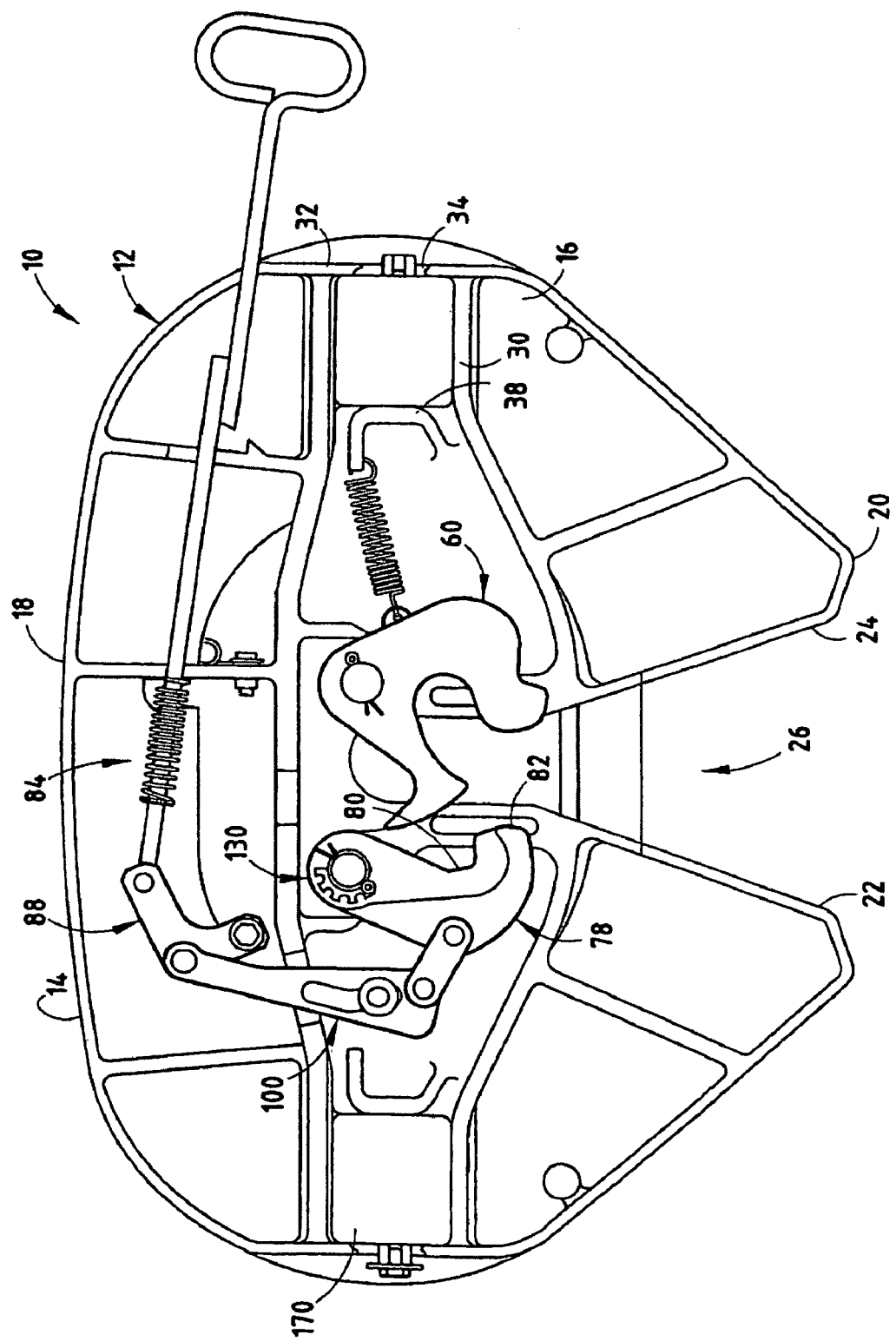
FIG. 3 is a bottom plan view of the fifth wheel hitch assembly, wherein the fifth wheel hitch assembly is in a fully released, unlocked, or ready to couple condition.

For purposes of description herein, the terms "upper," "lower," "right," "left," "rear," "front," "vertical," "horizontal," and derivatives thereof shall relate to the invention as oriented in FIGS. 1-3. However, it is to be understood that the invention may assume various alternative orientations and step sequences, except where expressly specified to the contrary. It is also to be understood that the specific devices and processes illustrated in the attached drawings, and described in the following specification are exemplary embodiments of the inventive concepts defined in the appended claims. Hence, specific dimensions and other physical characteristics relating to the embodiments disclosed herein are not to be considered as limiting, unless the claims expressly state otherwise.

The reference numeral 10 (FIGS. 1-3) generally designates a fifth wheel hitch assembly embodying the present invention. In the illustrated example, the hitch assembly 10 includes a top hitch plate 12 having a top surface 14 adapted to support a load thereon, a bottom surface 16 opposite the top surface 14, a forward end 18 having a generally convex shape, and a rearward end 20 bifurcated into a first portion 22 and a second portion 24, wherein the first portion 22 and the second portion 24 define a throat 26 therebetween for receiving a king pin (not shown) therein. The top hitch pate 12 also includes a first laterally-extending structural support rib or a forward rib 28 extending downwardly from the bottom surface 16 and located between the forward end 18 and the rearward end 20 of the hitch plate 12. The hitch plate 12 further includes a second laterally extending structural support rib or rearward rib 30 extending downwardly from the bottom surface 16 and located between the first support rib 28 and the rearward end 20 of hitch plate 12. The forward rib 28 and rearward rib 30 each extend laterally across the bottom surface 16 of the hitch plate 12 between a pair of outer walls 32 that are located on opposite sides of the hitch plate 12 and extend downwardly from the bottom surface 16. Each outer wall 32 includes an aperture 34 extending therethrough and adapted to receive a pivot pin 36 therethrough, as described below. The hitch plate 12 further includes a pair of inner ears 38 extending longitudinally between the forward rib 28 and the rearward rib 30. Each ear 38 includes an aperture 40 extending therethrough and adapted to receive the pivot pin 36 therein, as described below. Each ear 38 is substantially offset from at least a select one of the forward rib 28 and the rearward rib 30, thereby providing spaces 42 between the forward rib 28, or the rearward rib 30. Preferably, each ear 38 is substantially offset from both the forward rib 28 and the rearward rib 30 to provide a space 42 between each ear 38 and both the forward rib 28 and rearward rib 30, thereby reducing the material required to construct the hitch plate 12 as compared to a hitch plate wherein the ears extend the full distance and are connected to a pair of associated ribs. Of particular significance, the inventive inner ear configuration eliminates the need for risers when casting, as well as the need for any post-casting surface treatment, thereby markedly improving manufacturability.

Figure 4:
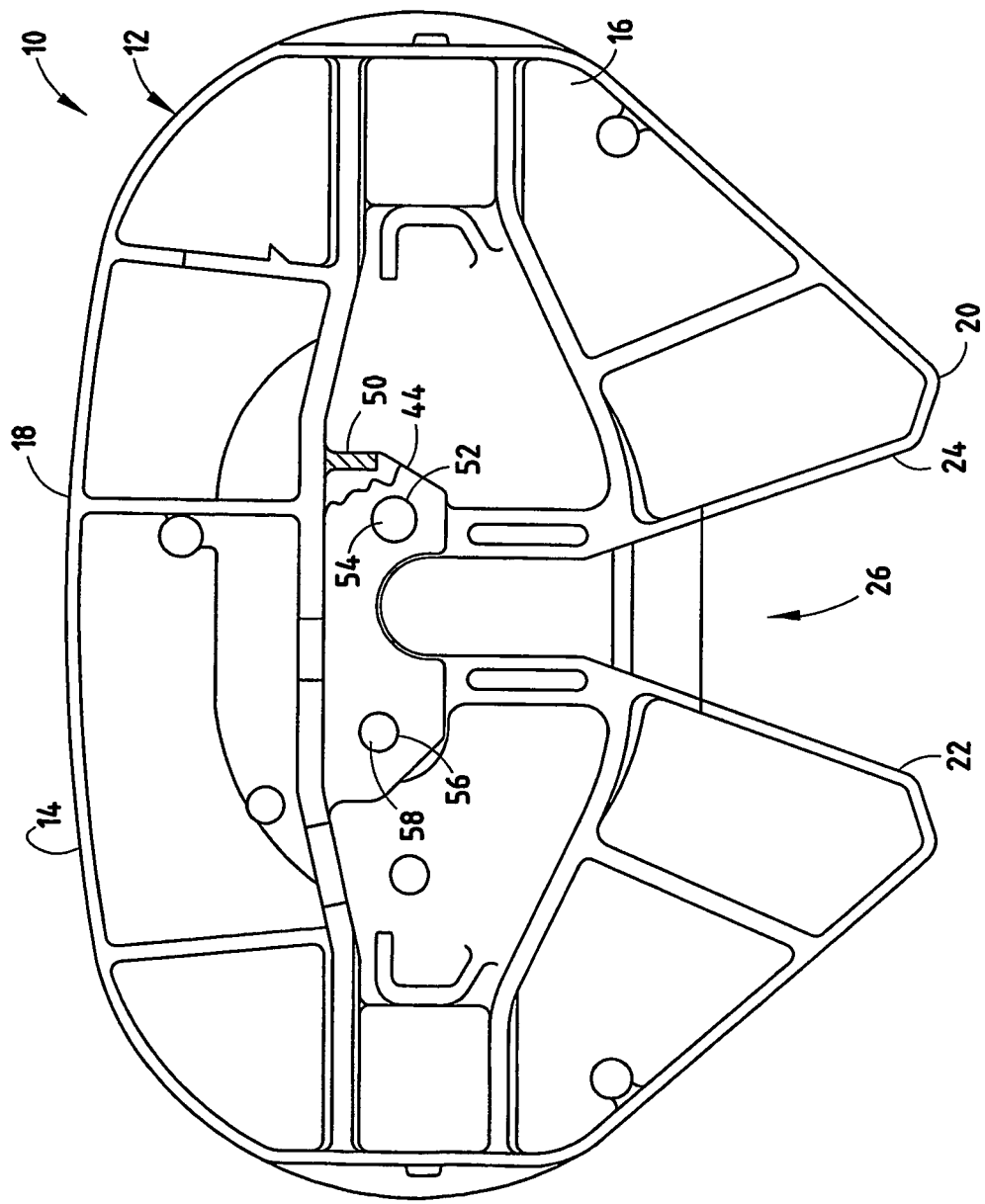
FIG. 4 is a bottom plan view of the fifth wheel hitch assembly.

The top hitch plate further includes a planar shelf member 44 (FIGS. 4 and 5) substantially offset from the bottom surface 16, thereby creating a gap 46 between the bottom surface 16 of the hitch plate 12 and the shelf member 44. The shelf member 44 is directly connected to the forward rib 28 and is substantially spaced apart from the rearward rib 30. The shelf member 44 is partially supported by a pair of support walls 50 extending downwardly from bottom surface 16 of hitch plate 12 and rearwardly from forward rib 28. The shelf member 44 includes a locking jaw pin aperture 52 that receives a locking jaw pin 54 therein, and a hook jaw pin aperture 56 that receives a hook jaw pin 58 therein, as described below.

The hitch assembly 10 (FIGS. 1-3) further includes a lock jaw 60 pivotably coupled to the hitch plate 12 within the throat 26 of the hitch plate 12 via the locking jaw pin 54. The locking jaw 60 is provided in a U-shape and is bifurcated into two integral branches 62 and 64. The branch 64 is a locking branch, while the branch 62 will be called, for convenience, a camming branch. The central axis of the locking jaw pin 54 is laterally offset from the dead end portion of the throat 26. The locking jaw 60 pivots on the pin 54 between the fully closed and locked position, as shown in FIG. 1, an unlocked position, as shown in FIG. 2, and the fully opened or "ready to couple" position, as shown in FIG. 3. The locking jaw 60 has a concave recess (king pin lock surface) 66 located between the branches 62 and 64 to cooperate with a concave forward end 68 of the throat 26, thereby cylindrically surrounding a neck portion of the king pin (not shown). The branch 62 is generally forward of the central axis of the locking jaw pin 54, while the branch 64 is generally rearward of this axis, except in the fully open position of the locking jaw 60. The forwardly-located branch 62 includes a protruding finger 70 having a camming surface 72 near the end thereof. The rearward branch 64 includes the concave king pin lock surface 66 on an inner surface and a concave hook-receiving recess 76 on an outer surface thereof.

The hitch assembly 10 further includes a hook jaw 78 located adjacent the throat 26 and pivotably mounted to the hitch plate 12 via the hook jaw pin 58. The hook jaw 78 is C-shaped and defines a concave recess 80 that receives a distal end 77 of the locking jaw 60 therein when the hitch assembly 10 is in the fully locked position, and a distal end 82 that is received within the recess 76 of the locking jaw 60 when the hitch assembly 10 is in the fully locked position.

The hitch assembly 10 further includes a hitch actuator assembly 84 that includes a manual actuator handle or release lever 86 slidably coupled to the hitch plate 12, and operable between a retracted position corresponding to the locked position of the hitch assembly 10, as shown in FIG. 1, and an extended position corresponding to the fully open position of the hitch assembly 10, as shown in FIG. 3. The actuator assembly 84 also includes an L-shaped first linkage member 88 having a first end 90 pivotally coupled to the release lever 86 at a pivot point 92, a second end 94 pivotally coupled to the hitch plate 12 at a pivot point 96, and a pivot point 98 located at a midpoint of the first linkage member 88 located between the first end 90 and the second end 94. A second linkage member 100 includes a first end 102 pivotably coupled at the pivot point 98 to the first linkage member 88, and a second end 104. The second linkage member 100 includes a longitudinally-extending slot 106 having a bend 108 along the length thereof. The second linkage member 100 is slidably coupled to the hitch plate 12 via hardware 110, such as a machined bolt, that extends through the slot 106. A third linkage member 112 has a first end 114 that is pivotally coupled to the second end 104 of the second linkage member 100 at a pivot point 116, and a second end 118 pivotably coupled to the hook jaw 78 at a pivot point 120 located along the length thereof. The release lever 86, linkage members 88, 100 and 112, and the associated pivot points 92, 96, 98, 116 and 120 are assembled such that pivot point 116 between second linkage member 100 and third linkage member 112 is located rearwardly of pivot point 120 between third linkage member 112 and hook jaw 78, that is in turn located rearwardly of the pivot point formed by hook jaw pin 58 about which the hook jaw 78 rotates, when the hitch assembly 10 is in the fully locked position. As a result, a force exerted by the hook jaw 78 in a direction represented by direction arrow 122 creates a moment arm force about pivot point 116, resulting in a torquing force about pivot point 116 in a direction as indicated by directional arrow 124, thereby causing the second linkage arm 100 to pivot about the connector 110 in a direction as indicated by directional arrow 126, resulting in a force being exerted on the pivot point 116 and the pivot point 118 in a direction as indicated by directional arrow 128, and forcing the hook jaw 78 to remain engaged with the locking jaw 60. The force exerted on the hook jaw 78 in a direction as indicated by directional arrow 128 reduces the force required to be exerted by a coil spring 129 positioned so as to bias the release lever 86 towards the retracted position and increases the lock-up pressure of the hitch assembly 10 when in the fully locked position. Because the bias force that must be exerted by spring 129 is reduced, a spring may be utilized that requires less pulling force to be applied to release handle 86. As a result, the pull force required to release the lock may be reduced to as low as 30 pounds, which is half that required for conventional release handles.

The hitch assembly 10 further includes a hook jaw adjustment assembly 130 (FIGS. 6-8) that includes the hook jaw pin 58, an adjustment pin 132, and a biasing spring 134. The hook jaw pin 58 includes a shank 136 having a first portion 138, a second or cammed portion 140, and a third portion 142. The third portion 142 has a circumferentially-extending groove 144. The hook jaw pin 58 also includes a head portion 145 having a top surface 146, a bottom surface 148, and a side edge 150. The side edge 150 includes a plurality of inwardly-extending notches or recesses 152 spaced circumferentially thereabout, and sized to receive the adjustment pin 132 therein, as described below. In assembly, the hook jaw pin 58 is retained within an aperture 154 extending through hitch plate 12 and the aperture 56 of the shelf member 44 by a retainer 156 that engages the groove 144 of the third portion 142. The cammed portion 140 of the hook jaw pin 58 is located within the pivoting aperture 157 of the hook jaw 78. The top surface 146 of the hook jaw pin 58 is substantially flush with the top surface 14 of the hitch plate 12 when the hook jaw pin 58 is assembled within the hitch assembly 10. The adjustment pin 132 is located within an adjustment aperture 157, and is biased upwardly by a coil spring 134, such that a collar 160 abuts the bottom surface 148 of the head portion 145 of the pin 58 and the adjustment pin 132 is located within one of the notches 152, thereby preventing rotation of the pin 58. To adjust the location of the hook jaw 78 with respect to the hitch plate 12, the adjustment pin 132 is depressed downwardly against the biasing spring 134 until the head portion 145 of the pin 58 is able to rotate past the adjustment pin 132. The head portion 145 of the pin 58 is provided with a slot-shaped aperture 162 adapted to receive the head of a standard-type screwdriver therein, thereby allowing easy rotation of the pin 58 once the adjustment pin 132 is depressed. Such an arrangement allows easy adjustment of the hook jaw 78 from the top of the hitch assembly as may be needed due to wear.

Figure 9:
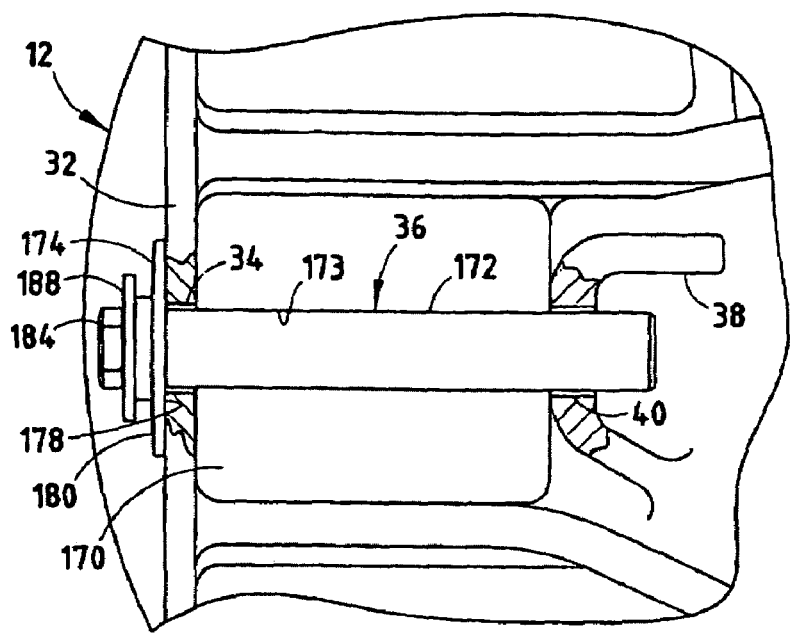
FIG. 9 is an enlarged, partial cross-sectional bottom plan view of a top plate and a pivot bolt assembly.
Figure 10:
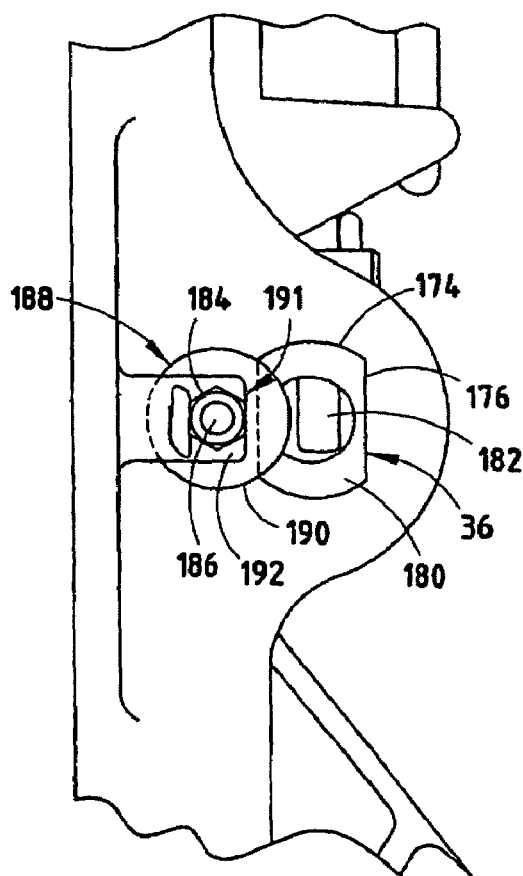
FIG. 10 is an enlarged side view of the top plate and pivot bolt assembly.

The pivot or bracket pins 36 (FIGS. 9 and 10) pivotally couple the top plate 12 to a support structure 170 typically associated with fifth wheel-type hitch assemblies, such that the top plate 12 may be pivoted from a true horizontal plane, but remain in a generally horizontal orientation. Each pivot pin 36 includes a shank portion 172 received within aperture 40 of the associated inner ear 38, the aperture 34 of the associated outer wall 32, and an aperture 173 extending through the support structure 170. Each pivot pin 36 further includes a head portion 174 having a pair of oppositely opposed flat side edges 176, a bottom surface 178, a top surface 180, and defining a central axis 182. A locking bolt 184 having a central axis 186 that is offset from, but parallel to, the central axis 182 of the pivot pin 36 is threadably connected to the associated side wall 32 and holds a locking washer 188 in place that abuts the pivot pin 36, thereby retaining the pivot pin 36 within apertures 34, 40 and 173. The locking washer 188 includes a first portion 190 having a first radius, and a second portion having a second radius that is less than the radius of the first portion. In assembly, pivot pin 36 is placed within apertures 34, 40 and 173. The locking washer 188 is positioned such that the first portion 190 of the locking washer 188 overlaps the head portion 174 of the pivot pin 36, and one of the flat edges 176 of the head portion 174 of the pivot pin 36 abuts a straight edge 191 of a raised portion 192 of the side wall 32, thereby preventing rotation of the pivot pin 36 within the apertures 34, 40 and 173. The locking washer 188 is then held in place by the locking bolt 184.

With further reference to FIGS. 11 and 12, the release assembly may include a release cam member 200 to release the hitch. Release cam member 200 is pivotally mounted to a post 204, and extends through a clearance opening 205 and rib 206. A release handle 201 is biased inwardly by a first spring 202, and a second spring 203 biases the release cam member 200 in a counterclockwise direction about the post 204. Release cam member 200 has an L-shaped opening 207 having an end portion 208 and a cam edge surface 209. The bolt 216 extends through opening 207 in release cam member 200, and threadingly engages post 204 and sandwiches a bushing 218 between washers 217. Bushing 218 has a length that is greater than the thickness of the release cam member 200, such that release cam member 200 can pivot and translate freely about the post 204. In use, the lock mechanism 210 is released by pulling the release handle 201 outwardly. The end 211 of handle 201 is pivotally connected to release cam member 200 at opening 212, such that movement of the release handle 201 outwardly causes the release cam member 200 to begin pivoting about a hook pin 213 that extends through opening 215 in release cam member 200 to thereby pivotally connect the release cam member 200 to the hook 214. As the release cam member 200 pivots about hook pin 213 in a clockwise manner, notched surface 219 of release cam member 200 shifts to clear the edge of the opening 205 through rib 206. Also, rotation of release cam member 200 removes the post 204 from the end 208 of opening 207 in release cam member 200. As the release cam member 200 continues to rotate, the release cam member 200 translates and rotates as post 204 slides along cam edge surface 209 in opening 207. Movement of the release cam member 200 along cam edge surface 209 causes hook 214 to swing into the open position. The release handle 201 is then pulled outwardly, and shifted slightly to engage notch 220 of handle 201 on the edge of clearance opening or window 221 in rib 222 to thereby retain the release handle 201 in the release position. In this position, hook 214 is disengaged from lock 210, such that the lock 210 can swing freely when the king pin is pulled out. As described in more detail above, as lock 210 is opened, it pushes hook 214 open further. The movement of hook 214 shifts release handle 201 and causes notch 220 to disengage from the edge of opening 221. Also, the spring 202 is angled somewhat, such that it pulls release handle 201 in the direction of the arrow "A" (FIG. 11) such that notch 220 does not engage the edge of clearance opening 221 and rib 222. The edge is then in the ready-to-couple position. When the king pin comes into the hitch, it contacts lock 210 and swings lock 210 closed allowing hook 214 to engage lock 210 such that release cam member 200 shifts into the locked position (i.e., post 204 is positioned in end 208 of opening 207 of release cam member 200) by springs 202 and 203.

The present inventive fifth wheel hitch assembly is lightweight, durable, reduces manufacturing costs associated therewith, is easily assembled during construction, easily adjusted during operation, is efficient to use, economical to manufacture, capable of a long operating life, and is particularly well adapted for the proposed use. The above-described hitch assembly provides for about a 12% or greater weight reduction in the top plate (i.e., weight reductions on the order of 27-40 pounds) to allow for a top plate having a weight of as little as 200 pounds while still meeting all the requirements for qualifying for loads of 59,000 pounds or more. The above configuration is advantageous in that drilling the aperture for locking bolt 184 is along an axis parallel to that of apertures 34 and 40, thereby improving manufacturability. Additionally, this configuration does not require an additional appendage extending from the casting to otherwise support locking bolt 184.

In the foregoing description, it will be readily appreciated by those skilled in the art that modifications may be made to the invention without departing from the concepts disclosed herein. Such modifications are to be considered as included in the following claims, unless these claims by their language expressly state otherwise.

The invention claimed is:

1. A top hitch plate adapted for use within a fifth wheel hitch, comprising:
    a top surface adapted to support a load thereon;
    a bottom surface opposite the top surface;
    a forward end having a convex shape;
    a rearward end bifurcated into a first portion and a second portion, wherein the first portion and the second portion define a throat therebetween for receiving a kingpin therein;
    a first laterally extending structural support rib extending downwardly from the bottom surface and located between the forward end and rearward end of the top hitch;
    a second laterally extending structural support rib extending downwardly from the bottom surface and located between the first support rib and the rearward end of the top hitch; and
    a pair of ears, each being curved along a length thereof with respect to a vertical plane and extending downwardly from the bottom surface and extending longitudinally between the first and second support ribs, wherein each ear includes an aperture extending therethrough adapted to receive a pivot pin therein to pivotably support the top hitch plate on a supporting structure, and wherein each ear includes at least one end that is substantially offset from at least a selected one of the first support rib and the second support rib and defines a gap therebetween.

2. The top hitch plate of claim 1, wherein each ear defines opposite ends that are substantially offset from both the first rib and the second rib.

3. The top hitch plate of claim 2, further including:
    a pair of outer walls each including an aperture extending therethrough adapted to receive the pivot pins therein, wherein the outer walls cooperate with the ears to pivotably support the top hitch plate on the supporting structure.

4. The top hitch plate of claim 1, wherein each ear is gusseted.

* * * * *